3,294,728
PROCESS FOR PREPARING DISPERSIONS OF OLEFIN POLYMERS CONTAINING POSITIVELY CHARGED PARTICLES WITH TERTIARY OR QUATERNARY AMMONIUM ETHOXYLATED FATTY AMINES
Alfred Kühlkamp, Hofheim, Taunus, and Elmar Heiskel, Frankfurt am Main, Germany, assignors to Farbwerke Hoechst Aktiengesellschaft vormals Meister Lucius & Bruning, Frankfurt am Main, Germany, a corporation of Germany
No Drawing. Filed Jan. 23, 1963, Ser. No. 253,274
Claims priority, application Germany, Jan. 27, 1962, F 35,873
6 Claims. (Cl. 260—29.6)

The present invention relates to a process for preparing dispersions of olefin homopolymers and copolymers containing positively charged particles and to the dispersions prepared by this process.

It is known that aqueous dispersions of olefin homopolymers and copolymers can be prepared in various ways of which the emulsion polymerization process is preferred. In all cases in which an emulsion polymerization cannot be carried through in water the polymer must be dispersed in the aqueous phase after it has been prepared.

Such a dispersion is either carried out in a kneader in the presence of water and emulsifiers, which is the case, for example, in the preparation of polyvinyl acetal dispersions, or a polymer solution is dispersed in an aqueous medium likewise containing emulsifiers and, if desired, protective colloids, and subsequently the solvent is removed. The latter method is preferred in cases in which the polymer has been prepared by a solution polymerization process and it is difficult or not possible to disperse it in the kneader. As emulsifiers there are generally used nonionic and/or anionic surface-active compounds. The composition of the emulsifiers depends to a large extent on the kind of the polymer to be emulsified. According to the known processes stable dispersions can be prepared which contain negatively charged particles and which can be used for many purposes.

For a number of applications, for example, for the chemical treatment of paper and textiles and for immersion coagulation processes, latices containing positively charged particles are desired and advantageous.

Now we have found that aqueous dispersions containing positively charged particles can be prepared from homopolymers of α-olefins or copolymers of α-olefins with one another or with vinyl acetate by using as an emulsifier 4 to 20% by weight, preferably 8 to 15% by weight, calculated on the polymer, of a salt of a weak acid with tertiary amines of the general formula

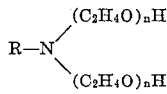

or quaternary ammonium bases of the general formula

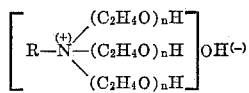

in each of which R represents an alkyl group containing 8 to 22, preferably 12 to 20, carbon atoms and $n$ stands for a number within the range of 1 to 30, preferably 1 to 15, and then, if desired, creaming up the dispersion thus obtained by the addition of 0.0005 to 10% by weight, preferably 0.001 to 0.01% by weight, calculated on the polymer, of a polyacrylamide serving as a creaming agent or protective colloid.

The polymers to be dispersed are advantageously preponderantly amorphous polymers.

In order to prepare the dispersions according to the invention a solution of 4 to 30% strength by weight—the strength depends on the solubility and viscosity of the polymer to be dispersed—in a solvent that is not miscible with water, for example, hexane, gasoline, benzene or chlorinated hydrocarbons, is emulsified in known manner by means of an efficacious emulifying device, for example, a high speed stirring device, in an aqueous medium containing one or more emulsifiers. After the emulsification the organic solvent is distilled off and, if desired, the aqueous dispersion which according to the initial concentration of the polymer solution has a strength within the range of 4 to 30% by weight, is concentrated by condensation, centrifuging or creaming up until it contains 50 to 60% by weight of solid substance.

The emulsifiers used according to the invention are salts of inorganic or organic acids, preferably weak acids such as acetic acid, propionic acid, formic acid, carbonic acid or boric acid, and tertiary amines or quaternary ammonium hydroxides of the general formula

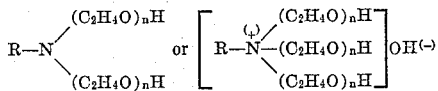

in which R represents an alkyl group containing 8 to 22, preferably 12 to 20, carbon atoms and $n$ stands for a number within the range of 1 to 30, preferably 1 to 15.

Salts of weak acids of the condensation products of fat amines, preferably those containing 8 to 22 carbon atoms, and 1 to 30, preferably 1 to 15, mols of ethylene oxide are particularly suitable emulsifiers.

Tertiary amines according to the general formula

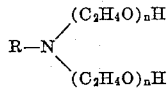

can be prepared, according to the process described in German Patent 667,744. Quaternary ammonium bases of the general formula

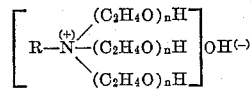

can be prepared according to the process described in British Patent 460,146.

The emulsifier is used in a quantity of 4 to 20% by weight, preferably 8 to 15% by weight, calculated on the polymer. In the concentration by creaming up half of the emulsifier used is eliminated together with the aqueous phase. This has the advantage that the latex which forms has a relatively low content of emulsifier.

Another advantage of the dispersions prepared according to the invention is that they can be coagulated by the addition of strong alkali hydroxides. By means of strong bases the dispersion can, for example, be precipitated on textiles or paper. This property of the dispersions to coagulate readily on the addition of an alkali hydroxide can also advantageously be used in the preparation of dipping goods.

For the purpose of concentrating the dispersion by creaming up (division of the dilute dispersion into a highly concentrated latex and an aqueous phase) so-called creaming agents have to be added. As an effective creaming agent for dispersions of, for example, copolymers of ethylene and propylene which have been prepared according to the invention polyacrylamine may be mentioned which in an aqueous solution of 1% strength by weight has a viscosity of 10 to 60, preferably 20 to 40, cp. at 20° C. and a pH of 7. A quick and thorough creaming up which takes place in a few hours and results in the separation of an aqueous phase which is practically free from polymer can be attained when the polyacrylamide is used in a concentration within the range of 0.0005 to 10% by weight, preferably 0.001 to 0.01% by weight, calculated on the polymer. The polyacrylamide is added in the form of a solution of 1% strength by weight, preferably after the organic solvent has been removed by distillation from the polymer dispersion.

For the creaming up of dispersions containing negatively charged particles there are normally used ionic, water-soluble polymers, for example, carboxymethyl cellulose, alginates or carrageen extracts. When these substances are used to cream up a dispersion that has been prepared with the use of cation-active emulsifiers a spontaneous coagulation takes place. It was therefore not to be expected that, when polyacrylamide was used as creaming agent for dispersions prepared with the use of cation-active emulsifiers, a very small quantity of this creaming agent was sufficient already to bring about a creaming up leading to the formation of a very stabled dispersion having a solids content of more than 50% by weight. The quantity of polyacrylamide required for the creaming up amounts to about 1/100 to 1/1000 of the quantity of creaming agent usually applied for the creaming up. It is known that it is very difficult to prepare latices which are actually stable and contain positively charged latex particles. It was therefore not to be expected that the dispersions according to the invention are distinguished by an extraordinarily high stability. The ξ-potential of these dispersions is about +90 mv. (measured electrophoretically in a U-tube).

The dispersions according to the invention are prepared by dispersing the solution of the polymer in an aqueous liquid containing the cation-active emulsifiers according to the invention in the above-mentioned concentrations, the solution having a strength within the range of 2 to 25% by weight, preferably 4 to 12% by weight, depending on the solubility of the polymer in the organic solvent, for example, hexane or benzene. Subsequently the solvent is distilled off in known manner under normal or reduced pressure. During the distillation no foaming can be observed, whereas in the known processes an operation of the aforesaid kind is usually accompanied by foaming. This, too, was not to be expected and is ascribed to the use of the cation-active emulsifiers and the formation of a dispersion containing positively charged latex particles.

After the distillation the polyacrylamide is added to the dispersion in the above-mentioned concentration in the form of an aqueous solution of about 1 to 0.1% strength by weight. Within a few hours a creaming up takes place. In this way a very stable dispersion of at least 50 to 60% strength by weight and a serum which is practically free from polymer are obtained. The serum contains at least 50% by weight of the cation-active emulsifier which has been added and after the quantity of emulsifier has been replenished it can again be used for the dispersion.

The dispersion can be brought about at a temperature within the range of 0° to 100° C., preferably 20° to 50° C. It may also be carried out at a temperature above 100° C., for example, at a temperature of up to about 250° C., when pressure is applied. The latter process is preferably applied when the starting polymer solution used has a relatively high concentration.

The polymers to be dispersed according to the invention are based on the monomers ethylene, propylene, isobutylene and vinyl acetate. The copolymers have the following basic molar composition:

80 to 50 mols percent of ethylene and 20 to 50 mols percent of propylene;
5 to 50 mols percent of vinyl acetate and 95 to 50 mols percent of ethylene.

The polymers are prepared in known manner by the Ziegler process (cf. Belgian Patent 588,764) or by the high pressure polymerization process (cf. German Patent 912,267).

The dispersions prepared according to the invention can be used for coating materials, preferably negatively charged materials, for example, paper, leather and textiles, and for preparing articles according to the immersion coagulation process.

The following examples serve to illustrate the invention but they are not intended to limit it thereto.

*Example 1.—Starting products*

129 grams of a copolymer of ethylene and propylene containing 35 mols percent of propylene (reduced viscosity 2.84, determined in a solution of 0.1% strength by weight in decahydronaphthalene at 135° C., in an Ostwald viscosimeter), 1,380 grams of hexane, 15 grams of a condensation product of oleyl amine and 10 mols of ethylene oxide which had been adjusted to a pH value of 6.8 by means of acetic acid, 1,500 grams of water, 3.5 grams of an aqueous solution of 1% strength by weight of a polyacrylamide having a viscosity of 32.5 cp., measured in a solution of 1% strength by weight at 20° C. and a pH value of 7.

The emulsifier (the condensation product of oleyl amine and ethylene oxide) was suspended in the water and the pH of the suspension was adjusted to 6.8 with acetic acid whereupon a clear solution was formed. The solution of the polymer in hexane was emulsified in the aqueous solution thus obtained by means of a high speed stirrer and the hexane was distilled off from this emulsion by a recycle process. To the resulting dispersion the solution of polyacrylamide was added. Within a few hours after this addition the mixture divided into an aqueous dispersion of 51% strength by weight and a serum which was practically free from polymer. The aqueous dispersion and the serum could be separated from one another in a separating funnel. The concentrated latex had a ξ-potential of +92 mv.

*Example 2.—Starting products*

240 grams of a copolymer of ethylene and propylene containing 30 mols percent of ethylene (reduced viscosity 2.88, determined in a solution of 0.1% strength by weight in decahydronaphthalene at 135° C. in an Ostwald viscosimeter), 2,760 grams of hexane, 28.8 grams of a condensation product of stearylamine and 4 mols of ethylene oxide which had been adjusted to a pH value of 6 by means of acetic acid, 300 grams of water, 9 grams of an aqueous solution of 1% strength by weight of a polyacrylamide having a viscosity of 32.5 cp., determined in an aqueous solution of 1% strength by weight at 20° C. and a pH value of 7.

The emulsifier (the condensation product of stearylamine and ethylene oxide) was dissolved in water while acetic acid was added until the solution had a pH value of 6.0. The solution of the polymer in hexane was emulsified with a high speed stirrer in the aqueous liquid and then the hexane was distilled off. After the resulting dispersion had been neutralized with sodium hydroxide solution until it had a pH value of 7 the polyacrylamide solution was stirred in and after a few hours a latex having a solids content of 54% by weight could be separated from a serum which was practically free from polymer.

The ξ-potential of the latex was +91 mv.

*Example 3.—Starting products*

150 grams of a copolymer of ethylene and vinyl acetate containing 38% by weight of vinyl acetate (viscosity at 120° C.: 43,500 centistrokes; molecular weight: about 5,000), 1,350 grams of benzene, 18 grams of a condensation product of stearylamine and 5 mols of ethylene oxide which had been adjusted to a pH value of 6 with acetic acid, 1,500 grams of water, 3 grams of an aqueous solution of 1% strength by weight of a polyacrylamide having a viscosity of 32.5 cp., determined in a solution of 1% strength by weight at 20° C. and a pH value of 7.

The experiment was carried out in a manner analogous to that described in Example 2 and a polymer dispersion having a solids content of 52% by weight was obtained.

We claim:

1. A process for the manufacture of an aqueous dispersion of a polymer selected from the group consisting of a homopolymer of an α-olefin, a polymer of two α-olefins and a copolymer of an α-olefin and vinyl acetate in which the solid particles are positively charged, which comprises emulsifying a solution of said polymer in a solvent not miscible with water in an aqueous solution containing as emulsifying agent 4 to 20 percent by weight, calculated on the polymer, of a salt composed of an acid and a member selected from the group consisting of a tertiary amine of the formula

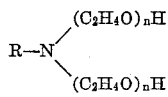

wherein R means an alkyl group having 8 to 22 carbon atoms and $n$ means a whole number from 1 to 30 and a quaternary ammonium hydroxide having the formula

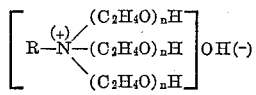

wherein R and $n$ have the same meanings as above and creaming the resulting dispersion by addition of 0.0005 to 10 percent by weight, calculated on the polymer, of a polyacrylamide as creaming agent.

2. A process as claimed in claim 1, wherein the copolymer of two α-olefins is an ethylene-propylene-copolymer.

3. A process as claimed in claim 1, wherein the emulsifying agent is a salt composed of acetic acid and the condensation product of a fat amine having 8 to 22 C-atoms in its alkyl rest and 1 to 30 mols ethylene oxide.

4. A process as claimed in claim 1, wherein the emulsifying agent is a salt composed of acetic acid and the condensation product of stearyl amine and 1 to 15 mols ethylene oxide.

5. A process as claimed in claim 1, wherein the emulsifying agent is a salt composed of acetic acid and the condensation product of oleyl amine and 1 to 15 mols ethylene oxide.

6. An aqueous dispersion having positively charged solid particles containing essentially 30 to 70 percent by weight of a polymer selected from the group consisting of a homopolymer of an α-olefin, a copolymer of two α-olefins and a copolymer of an α-olefin and vinyl acetate, 4 to 20 percent by weight, calculated on the polymer, of a salt composed of an acid and a member selected from the group consisting of a tertiary amine of formula

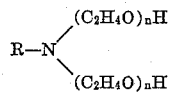

wherein R means an alkyl group having 8 to 22 carbon atoms and $n$ means a whole number from 1 to 30 and a quaternary ammonium hydroxide of the formula

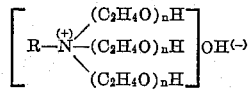

wherein R and $n$ have the same meanings as above as emulsifying agent and 0.0005 to 10 percent by weight, calculated on the polymer, of a polyacrylamide as creaming agent.

References Cited by the Examiner

UNITED STATES PATENTS 2,803,171  8/1957  Cubberly _____ 260—29.6
3,061,560  10/1962  Kuhlkamp _____ 260—29.6

FOREIGN PATENTS 912,267  5/1954  Germany.
460,146  1/1937  Great Britain.

OTHER REFERENCES

Armour Ethoxylated Chemicals, Armour Industrial Co., 26 pp., 110 North Wacker Drive, Chicago 6, Ill.

MURRAY TILLMAN, *Primary Examiner.*

SAMUEL H. BLECH, *Examiner.*

P. LIEBERMAN, *Assistant Examiner.*